US012517994B2

(12) United States Patent
Salamon

(10) Patent No.: US 12,517,994 B2
(45) Date of Patent: Jan. 6, 2026

(54) SYSTEMS AND METHODS FOR IMPROVED SECURITY BY FACIAL MICRO-EXPRESSION SEQUENCE

(71) Applicant: Dell Products, L.P., Round Rock, TX (US)

(72) Inventor: Victor Salamon, Edmonton (CA)

(73) Assignee: Dell Products, L.P., Round Rock, TX (US)

( * ) Notice: Subject to any disclaimer, the term of this patent is extended or adjusted under 35 U.S.C. 154(b) by 18 days.

(21) Appl. No.: 18/488,315

(22) Filed: Oct. 17, 2023

(65) Prior Publication Data

US 2025/0124117 A1 Apr. 17, 2025

(51) Int. Cl.
*G06F 21/00* (2013.01)
*G06F 21/32* (2013.01)

(52) U.S. Cl.
CPC .................................. *G06F 21/32* (2013.01)

(58) Field of Classification Search
CPC ...................................................... G06F 21/32
See application file for complete search history.

(56) References Cited

U.S. PATENT DOCUMENTS

| 8,970,348 | B1* | 3/2015 | Evans | G06F 21/32 340/5.83 |
|---|---|---|---|---|
| 12,072,962 | B2* | 8/2024 | Markhasin | G06V 40/16 |
| 2013/0159732 | A1* | 6/2013 | Leoutsarakos | H04L 9/085 713/193 |
| 2019/0147151 | A1* | 5/2019 | Scopis | H04L 63/0861 382/118 |
| 2023/0100874 | A1* | 3/2023 | Wu | G06V 40/28 726/19 |
| 2024/0070251 | A1* | 2/2024 | Maizels | G10L 13/02 |
| 2025/0077634 | A1* | 3/2025 | Knox | G06F 21/32 |

OTHER PUBLICATIONS

Kathrin Kaulard, et al., "Table S1: Review of existing facial expression databases that are often used in social psychology," 2012, 7 pages.
Takeo Kanade, et al., "Comprehensive database for facial expression analysis." Proceedings fourth IEEE international conference on automatic face and gesture recognition (cat. No. PR00580). IEEE, 2000, 8 pages.
Raghav V. Sampangi, et al., "Can't Lie to ME: Using Micro Expressions for User Authentication." In: Who are you?! Adventures in Authentication: WAY Workshop, Symposium on Usable Privacy and Security (SOUPS), 2014, 2 pages.

* cited by examiner

*Primary Examiner* — William A Corum, Jr.
(74) *Attorney, Agent, or Firm* — Fogarty LLP

(57) ABSTRACT

Systems and methods for improved security by facial micro-expression sequence are described. In an illustrative, non-limiting embodiment, an Information Handling System (IHS) may include: a processor; and a memory coupled to the processor, where the memory includes program instructions store thereon that, upon execution by the processor, cause the IHS to: obtain a video or a series of images of at least a portion of a face of a user of the IHS; determine a sequence of micro-expressions from the video or series of images; compare the determined sequence of micro-expressions to a stored sequence of micro-expressions; and authenticate the user based, at least in part, on the comparison indicating a match.

18 Claims, 4 Drawing Sheets

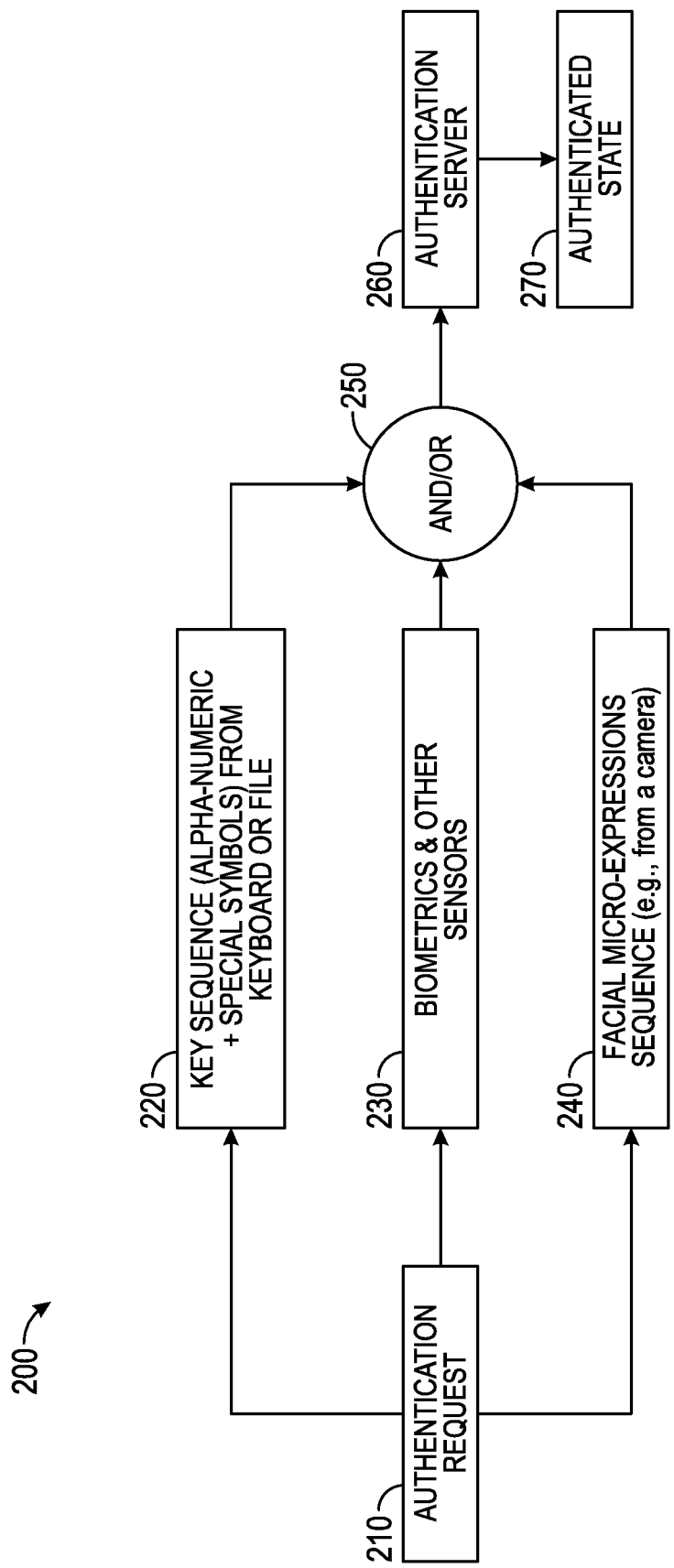

| FMEL NAME | ACTUAL EXPRESSION DESCRIPTION | EXAMPLE EXPRESSION PIC |
|---|---|---|
| FMEL-1 | LEFT EYE SIMPLE BLINK (CLOSE/OPEN) | 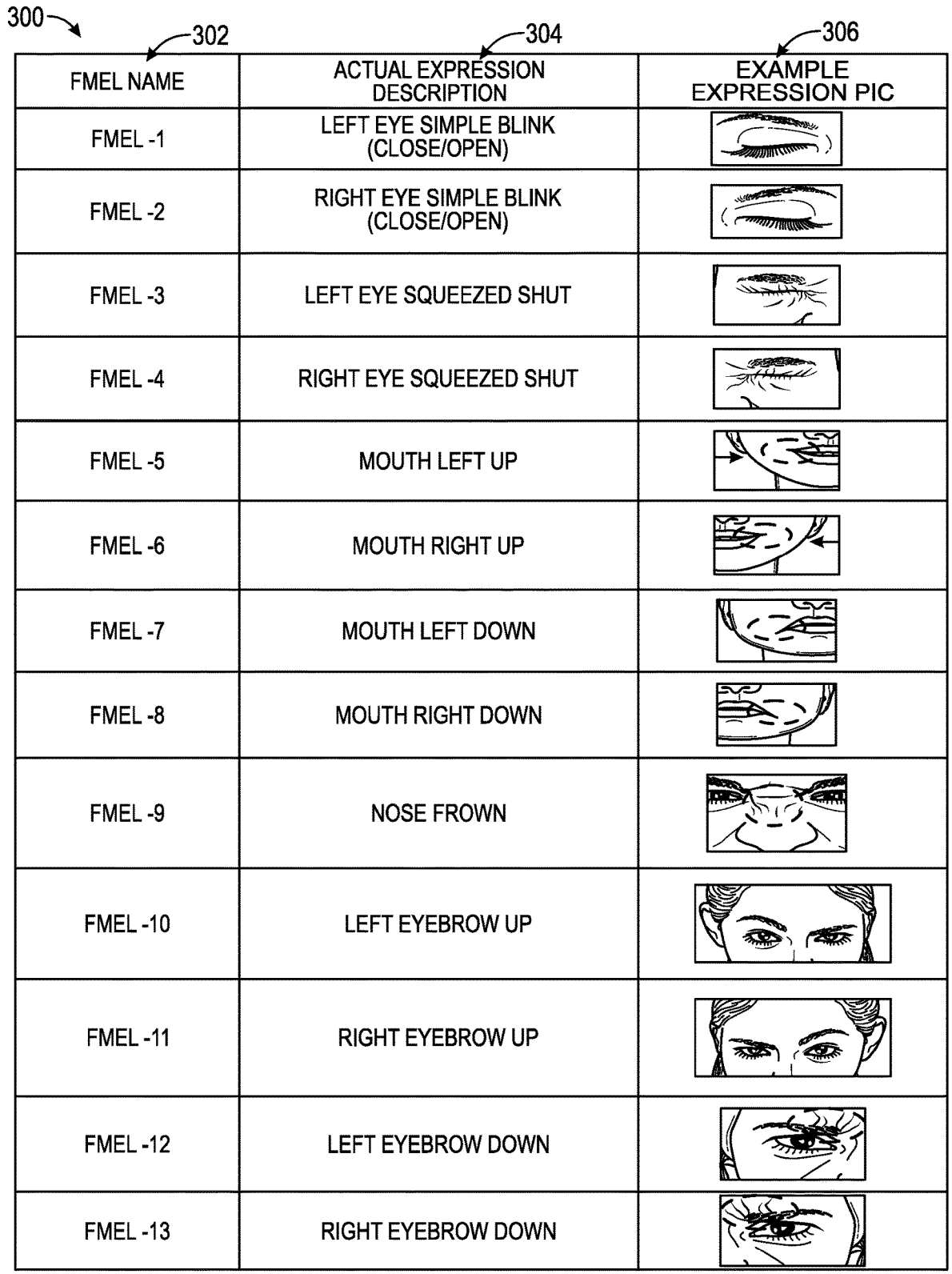 |
| FMEL-2 | RIGHT EYE SIMPLE BLINK (CLOSE/OPEN) |  |
| FMEL-3 | LEFT EYE SQUEEZED SHUT |  |
| FMEL-4 | RIGHT EYE SQUEEZED SHUT |  |
| FMEL-5 | MOUTH LEFT UP |  |
| FMEL-6 | MOUTH RIGHT UP |  |
| FMEL-7 | MOUTH LEFT DOWN |  |
| FMEL-8 | MOUTH RIGHT DOWN |  |
| FMEL-9 | NOSE FROWN |  |
| FMEL-10 | LEFT EYEBROW UP |  |
| FMEL-11 | RIGHT EYEBROW UP |  |
| FMEL-12 | LEFT EYEBROW DOWN |  |
| FMEL-13 | RIGHT EYEBROW DOWN |  |

FIG. 3

SYSTEMS AND METHODS FOR IMPROVED SECURITY BY FACIAL MICRO-EXPRESSION SEQUENCE

FIELD

This disclosure relates generally to Information Handling Systems (IHSs), and more specifically, to systems and methods for improved security by facial micro-expression sequence.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

As evidenced by the increasing number of recent news reports regarding successful network-based attacks on various businesses, the need for better approaches towards preventing the theft or misuse of business-critical or confidential data continues to grow. Some existing techniques, such as the deployment of virus-scanning software on an enterprise's computer systems, or the enforcement of requirements for non-trivial passwords, address small partitions of the data security problem space. However, especially in environments in which some of the security-sensitive assets may be stored in virtualization-based cloud environments, many organization managers may be unaware of all the types of vulnerabilities that may apply to their assets.

A traditional way for an attacker or hacker to gain unauthorized access to accounts is to steal passwords. A basic way to steal someone's password is through the keyboard or pin pad they use to authenticate. In case of a high value target (such as a government official, or financial institution employees), an attacker will go out of their way to steal these passwords using state-of-the-art attack vectors.

SUMMARY

Systems and methods for improved security by facial micro-expression sequence are described. In an illustrative, non-limiting embodiment, an Information Handling System (IHS) may include: a processor; and a memory coupled to the processor, where the memory includes program instructions store thereon that, upon execution by the processor, cause the IHS to: obtain a video or a series of images of at least a portion of a face of a user of the IHS; determine a sequence of micro-expressions from the video or series of images; compare the determined sequence of micro-expressions to a stored sequence of micro-expressions; and authenticate the user based, at least in part, on the comparison indicating a match.

In some embodiments, the stored sequence of micro-expressions includes a stored series of facial micro-expression letters ("FMEL"). In some embodiments, the program instructions, upon execution by the processor, further cause the IHS to: create a facial micro-expression mapping ("FMEM") of a plurality of facial expressions to a plurality of facial micro-expression letters ("FMEL") based, at least in part, on a facial micro-expression datastore ("FMED"). In some embodiments, the FMED includes a plurality of facial images that do not include the face of the user. In some embodiments, to determine the sequence of micro-expressions from the video or series of images, the program instructions, upon execution by the processor, further cause the IHS to: map the video or series of images to a series of FMELs using the created FMEM. In some embodiments, to compare the determined sequence of micro-expressions to a stored sequence of micro-expressions, the program instructions, upon execution by the processor, further cause the IHS to: compare an encoding of the series of FMELs to a stored encoded series of FMELs.

In some embodiments, to authenticate the user based, at least in part, on the comparison indicating a match, the program instructions, upon execution by the processor, further cause the IHS to: authenticate the user based solely on the comparison indicating a match. In some embodiments, to authenticate the user based, at least in part, on the comparison indicating a match, the program instructions, upon execution by the processor, further cause the IHS to: authenticate the user based, at least in part, on the comparison indicating a match and the independent entering of a correct password by the user.

In some embodiments, to obtain the video or series of images of the at least portion of the face of a user, the program instructions, upon execution by the processor, further cause the IHS to: obtain a sequence of characters entered by the user either before or after the obtained video or series of images, or along with the obtained video or series of images; where to determine the sequence of micro-expressions from the video or series of images, the program instructions, upon execution by the processor, further cause the IHS to: map the video or series of images to a series of facial micro-expression letters ("FMEL"); and where to compare the determined sequence of micro-expressions to a stored sequence of micro-expressions, the program instructions, upon execution by the processor, further cause the IHS to: assemble the obtained sequence of characters and the series of FMELs into an authentication sequence including characters and FMELs; encode the authentication sequence; and compare the encoded authentication sequence to a stored encoded authentication sequence.

In some embodiments, the program instructions, upon execution by the processor, further cause the IHS to: delete the obtained video or the series of images of the at least portion of the face of the user.

In another illustrative, non-limiting embodiment, a method, includes: obtaining a video or a series of images of at least a portion of a face of a user of an Information Handling System (IHS); determining a sequence of micro-expressions from the video or series of images; comparing the determined sequence of micro-expressions to a stored sequence of micro-expressions; and authenticating the user based, at least in part, on the comparison indicating a match.

In some embodiments, the method further includes: creating a facial micro-expression mapping ("FMEM") of a plurality of facial expressions to a plurality of facial micro-expression letters ("FMEL") based, at least in part, on a facial micro-expression datastore ("FMED"). In some embodiments, determining the sequence of micro-expressions from the video or series of images further includes: mapping the video or series of images to a series FMELs using the created FMEM. In some embodiments, comparing the determined sequence of micro-expressions to the stored sequence of micro-expressions further includes: comparing an encoding of the series of FMELs to a stored encoded series of FMELs. In some embodiments, authenticating the user based, at least in part, on the comparison indicating a match further includes: authenticating the user based, at least in part, on the comparison indicating a match and the independent entering of a correct password by the user.

In some embodiments, obtaining the video or series of images of the at least portion of the face of the user further includes: obtaining a sequence of characters entered by the user either before or after the obtained video or series of images, or along with the obtained video or series of images; where determining the sequence of micro-expressions from the video or series of images further includes: mapping the video or series of images to a series of facial micro-expression letters ("FMEL"); and where comparing the determined sequence of micro-expressions to the stored sequence of micro-expressions further includes: assembling the obtained sequence of characters and the series of FMELs into an authentication sequence including characters and FMELs; encoding the authentication sequence; and comparing the encoded authentication sequence to a stored encoded authentication sequence.

In another illustrative, non-limiting embodiment, one or more non-transitory computer-readable storage media store program instructions, that when executed on or across one or more processors of an Information Handling System (IHS), cause the one or more processors to: obtain a video or a series of images of at least a portion of a face of a user of the IHS; determine a sequence of micro-expressions from the video or series of images; compare the determined sequence of micro-expressions to a stored sequence of micro-expressions; and authenticate the user based, at least in part, on the comparison indicating a match.

In some embodiments, the program instructions further cause the one or more processors to: create a facial micro-expression mapping ("FMEM") of a plurality of facial expressions to a plurality of facial micro-expression letters ("FMEL") based, at least in part, on a facial micro-expression datastore ("FMED"). In some embodiments, to determine the sequence of micro-expressions from the video or series of images, the program instructions further cause the one or more processors to: mapping the video or series of images to a series FMELs using the created FMEM. In some embodiments, to compare the determined sequence of micro-expressions to a stored sequence of micro-expressions, the program instructions further cause the one or more processors to: compare an encoding of the series of FMELs to a stored encoded series of FMELs.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 2 is a diagram illustrating an example of an architecture for improved security by facial micro-expression sequence, according to some embodiments.

FIG. 3 is a table of some examples of facial micro-expression letters, according to some embodiments.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
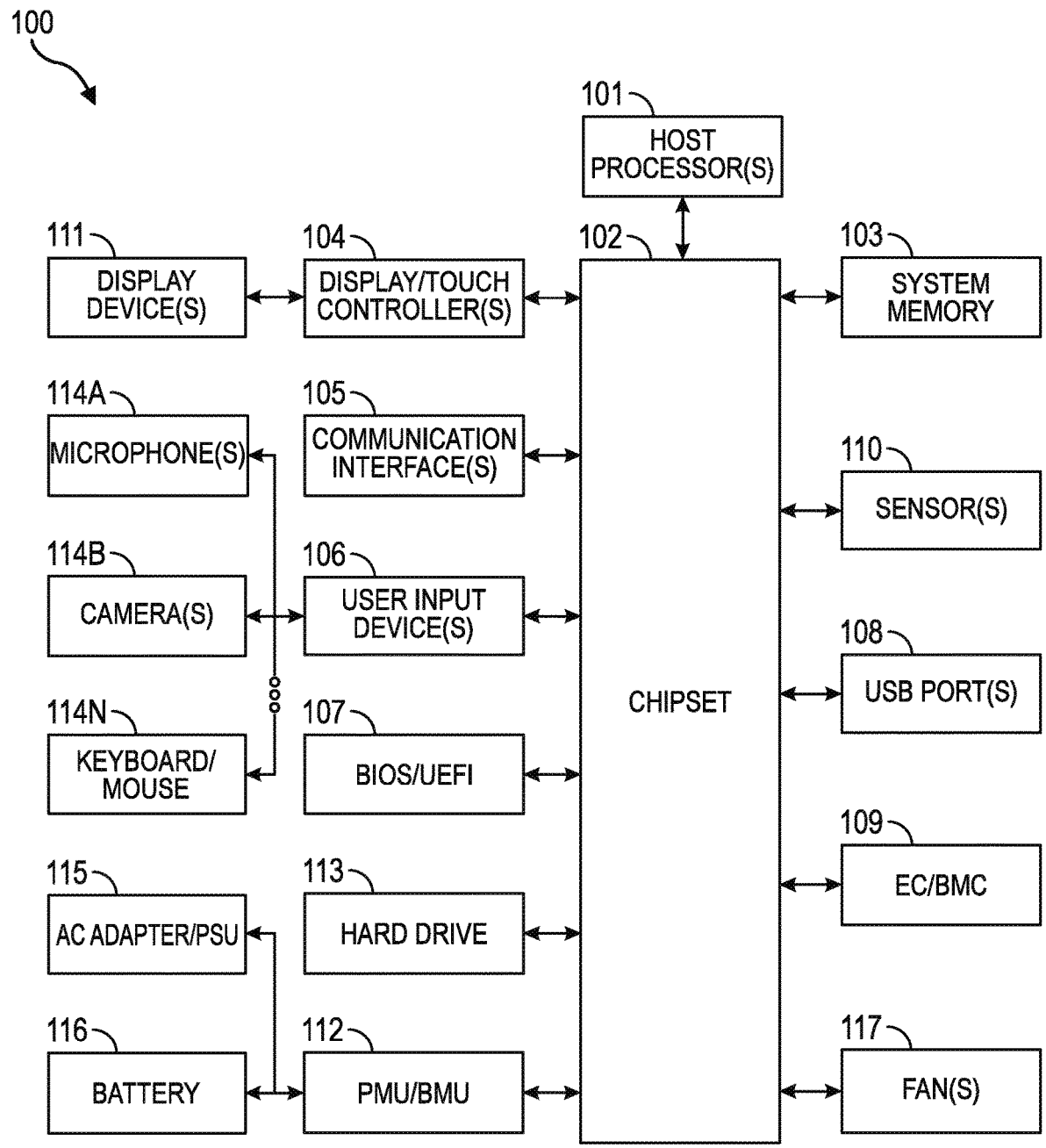
FIG. 1 is a diagram illustrating examples of hardware components of an Information Handling System (IHS), according to some embodiments.

FIG. 1 is a block diagram of hardware components of IHS 100, which may be used to implement the systems and methods for improved security by facial micro-expression sequence.

As depicted, IHS 100 includes host processor(s) 101. In various embodiments, IHS 100 may be a single-processor system, or a multi-processor system including two or more processors. Host processor(s) 101 may include any processor capable of executing program instructions, such as a PENTIUM processor, or any general-purpose or embedded processor implementing any of a variety of Instruction Set Architectures (ISAs), such as an x86 or a Reduced Instruction Set Computer (RISC) ISA (e.g., POWERPC, ARM, SPARC, MIPS, etc.).

IHS 100 includes chipset 102 coupled to host processor(s) 101. Chipset 102 may provide host processor(s) 101 with access to several resources. In some cases, chipset 102 may utilize a QuickPath Interconnect (QPI) bus to communicate with host processor(s) 101.

Chipset 102 may also be coupled to communication interface(s) 105 to enable communications between IHS 100 and various wired and/or wireless networks, such as Ethernet, Wi-Fi, BLUETOOTH (BT), cellular or mobile networks (e.g., Code-Division Multiple Access or "CDMA," Time-Division Multiple Access or "TDMA," Long-Term Evolution or "LTE," etc.), satellite networks, or the like. Communication interface(s) 105 may also be used to communicate with certain peripherals devices (e.g., BT speakers, microphones, headsets, etc.). Moreover, communication interface(s) 105 may be coupled to chipset 102 via a Peripheral Component Interconnect Express (PCIe) bus, or the like.

Chipset 102 may be coupled to display/touch controller(s) 104, which may include one or more Graphics Processor Units (GPUs) on a graphics bus, such as an Accelerated Graphics Port (AGP) or PCIe bus. As shown, display/touch controller(s) 104 provides video or display signals to one or more display device(s) 111.

Display device(s) 111 may include Liquid Crystal Display (LCD), Light Emitting Diode (LED), organic LED (OLED), or other thin film display technologies. Display device(s) 111 may include a plurality of pixels arranged in a matrix, configured to display visual information, such as text, two-dimensional images, video, three-dimensional images, etc. In some cases, display device(s) 111 may be provided as a single continuous display, or as two or more discrete displays.

Chipset 102 may provide host processor(s) 101 and/or display/touch controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like.

Chipset 102 may also provide host processor(s) 101 with access to one or more Universal Serial Bus (USB) ports 108, to which one or more peripheral devices may be coupled (e.g., integrated or external webcams, microphones, speakers, etc.).

Chipset 102 may further provide host processor(s) 101 with access to one or more hard disk drives, solid-state drives, optical drives, or other removable-media drives 113.

Chipset 102 may also provide access to one or more user input devices 106, for example, using a super I/O controller or the like. Examples of user input devices 106 include, but are not limited to, microphone(s) 114A, camera(s) 114B, and keyboard/mouse 114N. Other user input devices 106 may include a touchpad, stylus or active pen, totem, etc.

Each of the user input devices 106 may include a respective controller (e.g., a touchpad may have its own touchpad controller) that interfaces with chipset 102 through a wired or wireless connection (e.g., via communication interfaces(s) 105). In some cases, chipset 102 may also provide access to one or more user output devices (e.g., video projectors, paper printers, 3D printers, loudspeakers, audio headsets, Virtual/Augmented Reality (VR/AR) devices, etc.)

In certain embodiments, chipset 102 may further provide an interface for communications with hardware sensors 110.

Sensors 110 may be disposed on or within the chassis of IHS 100, or otherwise coupled to IHS 100, and may include, but are not limited to: electric, magnetic, radio, optical (e.g., camera, webcam, etc.), infrared, thermal (e.g., thermistors etc.), force, pressure, acoustic (e.g., microphone), ultrasonic, proximity, position, deformation, bending, direction, movement, velocity, rotation, gyroscope, Inertial Measurement Unit (IMU), and/or acceleration sensor(s).

Upon booting of IHS 100, host processor(s) 101 may utilize program instructions of Basic Input/Output System (BIOS) 107 to initialize and test hardware components coupled to IHS 100 and to load host OS for use by IHS 100. BIOS 107 provides an abstraction layer that allows host OS to interface with certain IHS components 100. Relying upon the hardware abstraction layer provided by BIOS 107, software stored in system memory 103 and executed by host processor(s) 101 can interface with certain I/O devices that are coupled to IHS 100.

The Unified Extensible Firmware Interface (UEFI) was designed as a successor to BIOS. As a result, many modern IHSs utilize UEFI in addition to or instead of a BIOS. As used herein, BIOS 107 is intended to also encompass a UEFI component.

Embedded Controller (EC) or Baseboard Management Controller (BMC) 109 is operational from the very start of each IHS power reset and handles various tasks not ordinarily handled by host processor(s) 101. Examples of these operations may include, but are not limited to: receiving and processing signals from a keyboard or touchpad, as well as other buttons and switches (e.g., power button, laptop lid switch, etc.), receiving and processing thermal measurements (e.g., performing fan control, CPU and GPU throttling, and emergency shutdown), controlling indicator LEDs (e.g., caps lock, scroll lock, num lock, battery, ac, power, wireless LAN, sleep, etc.), managing PMU/BMU 112, alternating current (AC) adapter/Power Supply Unit (PSU) 115 and/or battery 116, allowing remote diagnostics and remediation over network(s) 103, etc.

For example, EC/BMC 109 may implement operations for interfacing with power adapter/PSU 115 in managing power for IHS 100. Such operations may be performed to determine the power status of IHS 100, such as whether IHS 100 is operating from AC adapter/PSU 115 and/or battery 116.

Firmware instructions utilized by EC/BMC 109 may also be used to provide various core operations of IHS 100, such as power management and management of certain modes of IHS 100 (e.g., turbo modes, maximum operating clock frequencies of certain components, etc.).

In addition, EC/BMC 109 may implement operations for detecting certain changes to the physical configuration or posture of IHS 100. For instance, when IHS 100 as a 2-in-1 laptop/tablet form factor, EC/BMC 109 may receive inputs from a lid position or hinge angle sensor 110, and it may use those inputs to determine: whether the two sides of IHS 100 have been latched together to a closed position or a tablet position, the magnitude of a hinge or lid angle, etc. In response to these changes, the EC may enable or disable certain features of IHS 100 (e.g., front or rear facing camera, etc.).

In some cases, EC/BMC 109 may be configured to identify any number of IHS postures, including, but not limited to: laptop, stand, tablet, tent, or book. For example, when display(s) 111 of IHS 100 is open with respect to a horizontal keyboard portion, and the keyboard is facing up, EC/BMC 109 may determine IHS 100 to be in a laptop posture. When display(s) 111 of IHS 100 is open with respect to the horizontal keyboard portion, but the keyboard is facing down (e.g., its keys are against the top surface of a table), EC/BMC 109 may determine IHS 100 to be in a stand posture.

When the back of display(s) 111 is closed against the back of the keyboard portion, EC/BMC 109 may determine IHS 100 to be in a tablet posture. When IHS 100 has two display(s) 111 open side-by-side, EC/BMC 109 may determine IHS 100 to be in a book posture. When IHS 100 has two displays open to form a triangular structure sitting on a horizontal surface, such that a hinge between the displays is at the top vertex of the triangle, EC/BMC 109 may determine IHS 100 to be in a tent posture. In some implementations, EC/BMC 109 may also determine if display(s) 111 of IHS 100 are in a landscape or portrait orientation.

In some cases, EC/BMC 109 may be installed as a Trusted Execution Environment (TEE) component to the motherboard of IHS 100.

Additionally, or alternatively, EC/BMC 109 may be configured to calculate hashes or signatures that uniquely identify individual components of IHS 100. In such scenarios, EC/BMC 109 may calculate a hash value based on the configuration of a hardware and/or software component coupled to IHS 100. For instance, EC/BMC 109 may calculate a hash value based on all firmware and other code or settings stored in an onboard memory of a hardware component.

Hash values may be calculated as part of a trusted process of manufacturing IHS 100 and may be maintained in secure storage as a reference signature. EC/BMC 109 may later recalculate the hash value for a component, and may compare it against the reference hash value to determine if any modifications have been made to the component, thus indicating that the component has been compromised. In this manner, EC/BMC 109 may validate the integrity of hardware and software components installed in IHS 100.

In various embodiments, IHS 100 may be coupled to an external power source (e.g., AC outlet or mains) through AC adapter/PSU 115. AC adapter/PSU 115 may include an adapter portion having a central unit (e.g., a power brick, wall charger, or the like) configured to draw power from an AC outlet via a first electrical cord, convert the AC power to direct current (DC) power, and provide DC power to IHS 100 via a second electrical cord.

Additionally, or alternatively, AC adapter/PSU 115 may include an internal or external power supply portion (e.g., a switching power supply, etc.) connected to the second electrical cord and configured to convert AC to DC. AC adapter/PSU 115 may also supply a standby voltage, so that most of IHS 100 can be powered off after preparing for hibernation or shutdown, and powered back on by an event (e.g., remotely via wake-on-LAN, etc.). In general, AC adapter/PSU 115 may have any specific power rating, measured in volts or watts, and any suitable connectors.

IHS 100 may also include internal or external battery 116. Battery 116 may include, for example, a Lithium-ion or Li-ion rechargeable device capable of storing energy sufficient to power IHS 100 for an amount of time, depending upon the IHS's workloads, environmental conditions, etc. In some cases, a battery pack may also contain temperature sensors, voltage regulator circuits, voltage taps, and/or charge-state monitors.

Power Management Unit (PMU) 112 governs power functions of IHS 100, including AC adapter/PSU 115 and battery 116. For example, PMU 112 may be configured to: monitor power connections and battery charges, charge battery 116, control power to other components, devices, or ICs, shut down components when they are left idle, control sleep and power functions ("on" and "off"), manage interfaces for built-in keypad and touchpads, regulate real-time clocks (RTCs), etc.

In some implementations, PMU 112 may include one or more Power Management Integrated Circuits (PMICs) configured to control the flow and direction or electrical power in IHS 100. Particularly, a PMIC may be configured to perform battery management, power source selection, voltage regulation, voltage supervision, undervoltage protection, power sequencing, and/or charging operations. It may also include a DC-to-DC converter to allow dynamic voltage scaling, or the like.

Additionally, or alternatively, PMU 112 may include a Battery Management Unit (BMU) (referred to collectively as "PMU/BMU 112"). AC adapter/PSU 115 may be removably coupled to a battery charge controller within PMU/BMU 112 to provide IHS 100 with a source of DC power from battery cells within battery 116 (e.g., a lithium ion (Li-ion) or nickel metal hydride (NiMH) battery pack including one or more rechargeable batteries). PMU/BMU 112 may include non-volatile memory and it may be configured to collect and store battery status, charging, and discharging information, and to provide that information to other IHS components.

Examples of information collected and stored in a memory within PMU/BMU 112 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information (e.g., such as ambient temperature, relative humidity, system geolocation measured by GPS or triangulation, time and date, etc.), and BMU events.

Examples of BMU events may include, but are not limited to: acceleration or shock events, system transportation events, exposure to elevated temperature for extended time periods, high discharge current rate, combinations of battery voltage, battery current and/or battery temperature (e.g., elevated temperature event at full charge and/or high voltage causes more battery degradation than lower voltage), etc.

In some embodiments, power draw measurements may be conducted with control and monitoring of power supply via PMU/BMU 112. Power draw data may also be monitored with respect to individual components or devices of IHS 100. Whenever applicable, PMU/BMU 112 may administer the execution of a power policy, or the like.

IHS 100 may also include one or more fans 117 configured to cool down one or more components or devices of IHS 100 disposed inside a chassis, case, or housing. Fan(s) 117 may include any fan inside, or attached to, IHS 100 and used for active cooling. Fan(s) 117 may be used to draw cooler air into the case from the outside, expel warm air from inside, and/or move air across a heat sink to cool a particular IHS component. In various embodiments, both axial and sometimes centrifugal (blower/squirrel-cage) fans may be used.

In other embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components, such that all or a portion of the operations executed by the illustrated components may instead be executed by the integrated component.

For example, in various embodiments described herein, host processor(s) 101 and/or other components of IHS 100 (e.g., chipset 102, display/touch controller(s) 104, communication interface(s) 105, EC/BMC 109, etc.) may be replaced by discrete devices within a heterogenous computing platform (e.g., a System-On-Chip or "SoC"). As such, IHS 100 may assume different form factors including, but not limited to: servers, workstations, desktops, laptops, appliances, video game consoles, tablets, smartphones, etc.

The systems and methods described herein, in some embodiments, provide for improved security by facial micro-expression sequence. One of the basic user authentication points is a physical terminal, such as the keypad on an ATM, or the keyboard on a computer terminal. One of the basic attack vectors against terminal authentication is pin or password snooping. An attacker can remotely observe the key sequence a user types.

For example, in today's modern age, surveillance or security cameras are mounted ubiquitously (e.g., in shopping malls/stores, doorbell cameras, traffic cameras (mounted on rear view mirrors, stoplights, streetlamps), smartphones, and camera-equipped smart eyeglasses). These cameras record, and sometimes stream, all activities, without the express permission, or even knowledge, of the public. Furthermore, these recordings and streams are often insufficiently protected, security-wise, and an attacker can use these cameras for password snooping. As another example, an attacker can observe and record what is being typed, using a high powered or long-distance telescope. In case of both short key sequences (such as at an ATM pinpad) or long key sequences (such as a Secure Socket Shell ("SSH") passphrase), the sequence can simply be observed or recorded, for later playback and processing, to prepare an authentication attack.

There are basic solutions which attempt to protect the key sequence against snooping. A first solution is to cover the pin pad or keyboard while typing, with one of the hands or a dedicated cover. However, these approaches have a variety of problems. First, typing with the key area covered blocks the user's view also. This approach will be hard for users who don't touch-type, and so won't work for them. Second, if the keyboard is covered partially, to allow the user to see the keyboard, the typing fingers will also be covered only. As such the finger typing motions can be observed to replicate later. Third, a determined attacker can extract a variety of observed data from login recordings to extrapolate the login key sequence. The observed data can include: (a) The fingers' Placement on the keyboard; (b) The fingers' 3D Motions as they move across the keyboard; and (c) The sound/Click pattern of the fingers typing. This information can be referred to as placement, motions, click ("PMC") information. The attacker can reconstruct a simple pin from this PMC information.

For longer key sequences (such as passphrases), the attacker can a priori construct PMC for the entirety of the victim's dictionary. For example, the attacker can create PMC models for all the words of the English language, plus all known popular passwords. Then, the attacker can overlay the PMC observed in the recording, against the PMC model from the dictionary. Matches between the PMC model and the recorded PMC can be used as candidate sequences to log in. To further enhance the probability of success, the attacker can use statistical analysis to recreate actual words from the dictionary, in case the user used dictionary words as their passphrase.

A second solution which attempts to protect the key sequence against snooping is biometrics. Biometrics can be used to improve the security of logins, by requiring biometrics to amend or replace pin sequences or passphrases. The use of "biometrics" describes the authentication system's role to remember a user signature, formed from some of their unique characteristics (e.g., fingerprints shape, unique facial expressions, and eye iris patterns). However, biometrics are problematic also. First, not all users will want to share their biometrics as means of authentication, for privacy reasons. Second, biometrics are immutable, and once compromised they will be compromised forever. High value targets are also targets to get their biometrics stolen or cloned or copied. Once these biometrics are stolen, they are useless forever for authentication purposes. If someone steals a high value target's biometrics, this person can inherently never change their biometrics, and thus their biometric authentication is forever compromised.

A third solution which attempts to protect the key sequence against snooping is Multi-Factor Authentication ("MFA"). MFA can increase the security of a login session by asking for an additional independent verification (e.g., an identity or a separate value or token). However, first, when users use their phone as their main terminal (e.g., to authenticate a service), and they use the same device as their second authentication device, then the second identification is not really independent, disabling much of the main point of MFA. Secondly, the MFA device could similarly be snooped on remotely as the authentication terminal itself was snooped. Third, MFA is usually not deployed in bank or ATM access, for convenience reasons.

A fourth solution which attempts to protect the key sequence against snooping is randomized dynamic keyboard transformation. This solution adds an improved level of security by shifting the keys as the user types, such that a remote observer's view of the password would be "fooled". This is a security improvement. However, layering and/or dynamically varying multiple security methods (including the systems and methods, described herein, for improved security by facial micro-expression sequence) provides even better continuously improved authentication, especially for high value targets.

A fifth solution which attempts to protect the key sequence against snooping uses a non-observable sequence of inputs, through applying pressure through fingers or palms. The pressure through the fingers or palms is to be sensed through authentication devices, but is usually not observable by outside observers. However, this approach either requires specialized pressure-sensing devices, or uses existing input technology (e.g., a keyboard or pin pad) which is limited by low resolution.

Some embodiments of the systems and methods for improved security by facial micro-expression sequence, discussed herein, add facial micro-expression sequence 240 as an additional authentication method for an authentication request 210. FIG. 2 is a diagram illustrating an example of an architecture for improved security by facial micro-expression sequence 240, according to some embodiments. As shown in FIG. 2, facial micro-expression sequence 240 adds a new authentication enforcement method, which can either replace or supplement (as shown by the AND/OR 250 of the authentication methods) other forms of multi-factor authentication. These other forms of authentication can be a key sequence from a keyboard or file 220, or biometrics or other sensors 230. These multi-factor authentication methods (220, 230, 240) can be input into an authentication server 260 to provide for an authenticated state 270.

For users who are reticent of sharing their biometrics, some embodiments of the systems and methods described herein allow for the convenience of authenticating with the user's face, but the removal of the requirement for the system to remember the user's face biometrics as MFA enforcement. A sequence of facial micro-expressions to interlace with the key sequence used for a password or passkey can also be added, in some embodiments.

Some embodiments of the systems and methods described herein have multiple stages described more fully below. These multiple stages can be: 1) system setup; 2) authentication registration; and 3) authentication.

Stage 1: System Setup

The system setup stage is a preamble before any user attempts authentication. Some embodiments use large commercial generic face images to recognize facial micro-expressions. Such databases can be used as a component of the present embodiments. These types of database component can be referred to as Facial Micro-Expressions Databases ("FMEDs"). Some embodiments of the system setup stage include an authentication server. In this system setup stage, the authentication server can create a Facial Micro-Expressions Mapping ("FMEM"). FMEM can extract at least some recognizable facial micro-expressions from the FMEDs, and can build at least two types of information.

First, FMEM can build an alphabet of Facial Micro Expression Letters ("FMEL"). FMEL a mapping of facial expressions to FMEL codes. FIG. 3 is a table 300 of some examples of facial micro-expression letters ("FMELs"), according to some embodiments. FIG. 3 shows 13 different FMELs, with an FMEL names 303 from FMEL-1 to FMEL-13. The second column 304 of the table 300 provides a text description of the actual expression. The third column 306 of the table 300 provides an example expression picture for the corresponding FMEL. For example, FMEL-1 is a left eye simple blink, and the picture in column 306 for FMEL-1 depicts a left eye of a person in a closed position.

Second, FMEM can optionally build a dictionary of Facial Micro-Expression Words ("FMEWs"). These are expressions composed of multiple FMELs, which are expressed either together (e.g., blink with both eyes at the same time) or in a particular sequence. For example, a smile (both mouth corners up) can be FMEW-1, while right eye double-blink can be FMEW-2. These FMEWs will be used below. In a later stage, when some embodiments are presented with images of a user's face trying to authenticate, these embodiments can identify the user's micro-expressions from these existing FMEDs.

There can be a significant difference between some of the embodiments discussed herein, and biometrics-based solutions, for example. For example, in biometrics-based solutions, the authentication system remembers the unique signature of user's biometrics (e.g., face) as means to match it in the future for authentication purposes. In some of the embodiments of the present disclosure, the authentication system does not remember the user's biometrics. Some embodiments don't even store the user's face pictures, or any other characteristics of their biometrics. However, some embodiments of the present disclosure do remember a user's biometrics, and in fact store the user's face pictures. Some of these embodiments store a user's face pictures in order to compare those stored face pictures (including an encoding such as a hash of those face pictures, in some embodiments) with a micro-expression input sequence (including an encoding such as a hash of a micro-expression input sequence, in some embodiments).

Stage 2: Authentication Registration

At the authentication registration stage, the user can register into the authentication system. This registration stage may use existing methods which may include passwords, passkeys, passphrases, biometrics and/or other MFA factors. In addition to these authentication methods, some embodiments allow the user to specify a sequence of Facial Micro-Expressions (e.g., individual or combined) as part of their authentication registration. In addition, some embodiments allow the user to specify whether this sequence of Facial Micro-Expressions is to be interpreted as an independent sequence from other authentication methods, or whether it is to be interpreted as order-dependent with other authentication methods.

The following authentication registration example can help explain these concepts. In this authentication example, a user can set the password "01234" as their password identification sequence. In addition, the user can register the following facial micro-expression sequence for authentication: left eye blink, nose frown, smile (both mouth corners up), right eye double blink. Some embodiments can then use FMEM to map these facial micro-expressions into the following FMEL letters: (a) FMEL-1 (left eye blink); (b) FMEL-9 (nose frown); (c) FMEW-1 (smile with both mouth corners up, equivalent to simultaneous FMEL-5+FMEL-6); (d) FMEW-2 (right eye double blink, equivalent to FMEL-2 twice).

Some embodiments allow the user to choose the password to be either dependent, or independent, of the facial micro expression sequence. For example, in an independent form, the password "01234" can be registered independently from the facial micro-expression sequence FMEL-1, FMEL-9, FMEW-1, FMEW-2. In a dependent form, the sequence order of letters (e.g., alphanumeric characters plus facial micro-expressions) matters. For example, the user may specify they want this particular order to be registered as their authentication sequence: "0", "1", "FMEL-1", "2", "FMEL-9", "3", "FMEW-1", "4", "FMEW-2".

Usually, the process of authentication doesn't store the original sequence. That would be equivalent to storing passwords in cleartext (which would make them vulnerable to stealing). A simple way to avoid cleartext-storing passwords/passcodes, for example, is to store an encoding of the password/passcode in some way. A hash is one example of such an encoding. The original password/passcode sequence cannot be reverse-engineered (or it is much harder to reverse engineer the password/passcode) from the encoding/hash of the password/passcode. This principle can apply to passwords/passcodes in alphanumeric as well as the FMEL/FMEW alphabet. Therefore, in some embodiments of an independent password/passcode form, an encoding/hash of the registered micro-expression sequence can be stored. The encoding/hash can be stored in an authentication server, for example. In some embodiments of a dependent password/passcode form, an encoding/hash of the alphanumeric characters plus facial micro-expressions sequence can be stored.

In general, the authentication registration can make an authentication server a record of one or more sequences of facial micro-expression letters and/or words, and one or more sequences of inputs from other authentication methods (e.g., characters or alphanumeric letters from a keyboard). These 2 sequences may be independent, or they may have a dependent sequencing, depending on the user's choice at registration time.

The user allows an "authentication client" to take pictures (e.g., using a camera) of specific facial micro-expressions. In contrast to biometrics or facial recognition software, some embodiments of the authentication client do not need to remember or store the user's entire face or facial signature. In these embodiments, the system does not train on (or remember) any registered user's face. In this way, users skeptical of biometrics can be reassured that their face image or facial signature is not stored. However, some embodiments of the present disclosure do remember a user's biometrics, and in fact store the user's face pictures. Some of these embodiments store a user's face pictures in order to compare those stored face pictures (including an encoding such as a hash of those face pictures, in some embodiments)

with a micro-expression input sequence (including an encoding such as a hash of a micro-expression input sequence, in some embodiments).

Stage 3: Authentication

In an authentication stage, the user's facial micro-expressions (which can include an encoding/hash of the user's facial micro-expressions, in some embodiments) can be used for authentication. In an authentication sequence, according to some embodiments, the user can expose their face to a camera connected to one or more authentication clients. Then, in a cycle, these one or more authentication clients can, according to some embodiments: (a) capture a series of inputs, including temporary images of the user's face, and/or other alphanumeric inputs (e.g., letters, characters, other MFA inputs); (b) ask an authentication server to map (from FMEM) user face images into FMELs (letters) and/or FMEWs (words); and (c) in some embodiments, delete the temporary images of the user's face.

The authentication server can then assemble the sequence of letters (e.g., alphanumeric+FMEL) into an authentication sequence, and can perform the authentication process, in some embodiments. This authentication process can be the same as authentication processes which use only alphanumeric characters. However, some embodiments provide the following improvements or differences. First, the character set can be extended to include FMEL. Second, the authentication of FMEL can be done as a separate authentication of a separate code, or can be interlaced with the alphanumeric characters, depending on whether the user asked for independent or dependent facial micro-expression authentication registration.

The authentication can involve, in some embodiments, producing an encoding/hash of the micro-expression input sequence (or the alphanumeric (or general keyboard character set)+micro-expression input sequence). This encoding/hash of the micro-expression input sequence can be compared with an encoding/hash of the registered micro-expression sequence, in some embodiments. In some embodiments, an encoding/hash of the alphanumeric (or general keyboard character set)+micro-expression input sequence can be compared with an encoding/hash of the registered alphanumeric (or general keyboard character set)+micro-expression input sequence.

Example Method Embodiment

Figure 4:
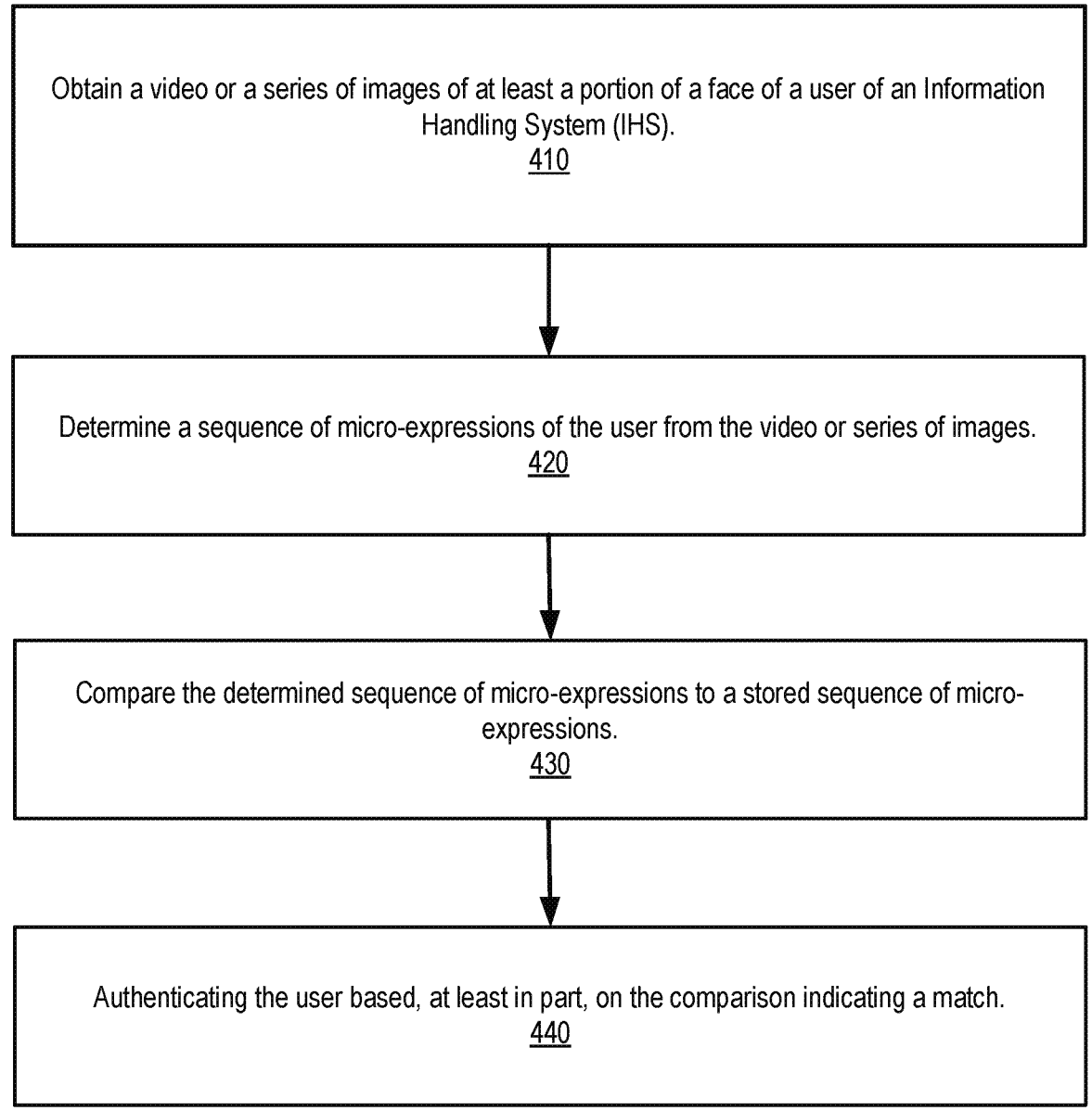
FIG. 4 is a flow diagram illustrating aspects of operations that may be performed to perform a method for improved security by facial micro-expression sequence, according to at least some embodiments.

FIG. 4 is a flow diagram illustrating aspects of operations that may be performed to perform a method for improved security by facial micro-expression sequence, according to at least some embodiments. The flowchart begins at block 410 which obtains a video or a series of images of at least a portion of a face of a user of an Information Handling System (IHS). The flowchart transitions to 420 which determines a sequence of micro-expressions of the user from the video or series of images.

Next, block 430 compares the determined sequence of micro-expressions to a stored sequence of micro-expressions. In some embodiments, this can involve comparing an encoding/hash of the micro-expression input sequence, with an encoding/hash of a registered micro-expression sequence. The encoding/hash of the registered micro-expression sequence can be stored in an authentication server, for example. In some embodiments, this can involve comparing an encoding/hash of an input sequence that contains both the alphanumeric (or general keyboard character set) characters along with micro-expressions, with an encoding/hash of a stored or registered input sequence that contains alphanumeric (or general keyboard character set) characters along with micro-expressions.

Finally, at block 440, the method authenticates the user based, at least in part, on the comparison indicating a match.

Some Examples of Novelty & Benefits

In some embodiments, the following aspects of these embodiments can be novel and/or beneficial. First, some embodiments use facial micro-expressions (instead of biometrics) for authentication. Second, there can be advantages to authenticating using a user's face. A first advantage is ease of authentication, with no typing required for this additional MFA method. Privacy from prying eyes or cameras that may be spying from the user's back provides another advantage to authenticating a user's face. The user's facial expressions cannot be monitored with the same cameras "from behind" which may be watching passwords being typed.

Third, the benefits of an added security layer, according to some embodiments, can come without a downside of permanently storing the user's biometrics (facial or otherwise). Many users are reticent to relinquish their biometrics to be stored for later authentication. Therefore, some embodiments provide the convenience of authenticating through camera-captured face imagery, without forcing users to relinquish their biometrics to be stored long-term for later authentication.

Fourth, these benefits of this added security layer can come without having to invest in new specialized devices. Existing cameras (e.g., from laptops, ATMs, webcams) can suffice.

A fifth aspect concerns the situation when the user chooses the sequence of Facial Micro Expressions as a dependent input to other authentication character sequences. In this case, the addition of Facial Micro Expression Letters effectively extends the set of alphanumeric letters allowed in user-authentication. In today's systems there are approximately 50 characters to use for passwords (26 characters in the English alphabet, plus 10 numeric characters, plus approximately 14 special characters). Using combination formulas, 50 characters allow $2^{50}=1125$ Trillion combinations for each word of 50 characters maximum each. Passphrases can have multiple words so that extends the number of combinations. These large numbers make passwords sound safe (especially since passphrases can have multiple words). However, quantum computing can represent a threat to computations of large numbers.

Facial Micro Expressions letters (FMEL) can expand the allowed alphabet by at least 31. The example set in FIG. 3 is limited. Thirty-one FMELs can easily be extended by combining FMELs into FMEWs. This FMEL alphabet extends the combinations of each word in a password to at least 81 characters, to allow for $2^{81}$ combinations. This is equal to $2.4178516392293*10^{24}$ combinations. This can make authentication systems safer. This wider character set can offer a wider set of sequences valid for authentication, which can lead to higher security.

A sixth aspect concerns the situation when the user chooses the sequence of Facial Micro-Expressions as an independent input from other authentication character sequences. In this case, our solution can be offered as another form of Multi-Factor Authentication. For example, the user can register the Facial Micro-Expression sequence with a camera, which is a device that is different than the device used by the user to input other authentication characters. This way, if one of the devices is compromised (e.g., to steal passwords), the other device might still offer independent security.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). This may include selecting predefined logic blocks and logically associating them. It may also include programming computer software-based logic of a retrofit control device, wiring discrete hardware components, or a combination thereof. Such configured devices are physically designed to perform the specified operation(s).

Various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
a processor; and
a memory coupled to the processor, wherein the memory comprises program instructions stored thereon that, upon execution by the processor, cause the IHS to:
   obtain a video or a series of images of at least a portion of a face of a user of the IHS, wherein obtain the video or the series of images comprises obtain a sequence of characters entered by the user either before or after the obtained video or series of images, or along with the obtained video or series of images;
   determine a sequence of micro-expressions from the video or series of images, wherein the sequence comprises a map of the video or series of images to a series of facial micro-expression letters ("FMEL");
   compare the determined sequence of micro-expressions to a stored sequence of micro-expressions, comprising:
      assemble the obtained sequence of characters and the series of FMELs into a combined authentication sequence comprising the sequence of characters and the series of FMELs;
      hash the combined authentication sequence based at least in part on a hash of at least: the combined sequence of characters and series of FMELs, to obtain an encoded combined authentication sequence; and
      compare the encoded combined authentication sequence to a stored encoded combined authentication sequence; and
   authenticate the user based, at least in part, on the comparison indicating a match.

2. The IHS of claim 1, wherein the stored sequence of micro-expressions comprises a stored series of facial micro-expression letters ("FMEL").

3. The IHS of claim 1, wherein the program instructions, upon execution by the processor, further cause the IHS to:
create a facial micro-expression mapping ("FMEM") of a plurality of facial expressions to a plurality of facial micro-expression letters ("FMEL") based, at least in part, on a facial micro-expression datastore ("FMED").

4. The IHS of claim 3, wherein the FMED comprises a plurality of facial images that do not include the face of the user.

5. The IHS of claim 3, wherein to determine the sequence of micro-expressions from the video or series of images, the program instructions, upon execution by the processor, further cause the IHS to:
map the video or series of images to a series of FMELs using the created FMEM.

6. The IHS of claim 5, wherein to compare the determined sequence of micro-expressions to a stored sequence of micro-expressions, the program instructions, upon execution by the processor, further cause the IHS to:
compare an encoding of the series of FMELs to a stored encoded series of FMELs.

7. The IHS of claim 1, wherein to authenticate the user based, at least in part, on the comparison indicating a match, the program instructions, upon execution by the processor, further cause the IHS to:
authenticate the user based solely on the comparison indicating a match.

8. The IHS of claim 1, wherein to authenticate the user based, at least in part, on the comparison indicating a match, the program instructions, upon execution by the processor, further cause the IHS to:
authenticate the user based, at least in part, on the comparison indicating a match and the independent entering of a correct password by the user.

9. The IHS of claim 1, wherein the program instructions, upon execution by the processor, further cause the IHS to:
delete the obtained video or the series of images of the at least a portion of the face of the user.

10. A method, comprising:
obtaining a video or a series of images of at least a portion of a face of a user of an Information Handling System (IHS), comprising obtaining a sequence of characters entered by the user either before or after the obtained video or series of images, or along with the obtained video or series of images;
determining a sequence of micro-expressions from the video or series of images, comprising mapping the video or series of images to a series of facial micro-expression letters ("FMEL");
comparing the determined sequence of micro-expressions to a stored sequence of micro-expressions, comprising:
assembling the obtained sequence of characters and the series of FMELs into a combined authentication sequence comprising the sequence of characters and the series of FMELs;
hashing the combined authentication sequence based at least in part on hashing the combined sequence of characters and series of FMELs, to obtain an encoded combined authentication sequence; and
comparing the encoded combined authentication sequence to a stored encoded combined authentication sequence; and
authenticating the user based, at least in part, on the comparison indicating a match.

11. The method of claim 10, further comprising:
creating a facial micro-expression mapping ("FMEM") of a plurality of facial expressions to a plurality of facial micro-expression letters ("FMEL") based, at least in part, on a facial micro-expression datastore ("FMED").

12. The method of claim 11, wherein determining the sequence of micro-expressions from the video or series of images further comprises:
mapping the video or series of images to a series FMELs using the created FMEM.

13. The method of claim 12, wherein comparing the determined sequence of micro-expressions to the stored sequence of micro-expressions further comprises:
comparing an encoding of the series of FMELs to a stored encoded series of FMELs.

14. The method of claim 10, wherein authenticating the user based, at least in part, on the comparison indicating a match further comprises:
authenticating the user based, at least in part, on the comparison indicating a match and the independent entering of a correct password by the user.

15. One or more non-transitory computer-readable storage media storing program instructions, that when executed on or across one or more processors of an Information Handling System (IHS), cause the one or more processors to:
obtain a video or a series of images of at least a portion of a face of a user of the IHS, wherein obtain the video or the series of images comprises obtain a sequence of characters entered by the user either before or after the obtained video or series of images, or along with the obtained video or series of images;
determine a sequence of micro-expressions from the video or series of images, wherein the sequence comprises a map of the video or series of images to a series of facial micro-expression letters ("FMEL");
compare the determined sequence of micro-expressions to a stored sequence of micro-expressions, wherein the compare comprises:
assemble the obtained sequence of characters and the series of FMELs into a combined authentication sequence that comprises the sequence of characters and the series of FMELs;
hash the combined authentication sequence based at least in part on a hash of at least: the combined sequence of characters and series of FMELs, to obtain an encoded combined authentication sequence; and
compare the encoded combined authentication sequence to a stored encoded combined authentication sequence; and
authenticate the user based, at least in part, on the comparison indicating a match.

16. The one or more non-transitory computer-readable storage media of claim 15, wherein the program instructions further cause the one or more processors to:
create a facial micro-expression mapping ("FMEM") of a plurality of facial expressions to a plurality of facial micro-expression letters ("FMEL") based, at least in part, on a facial micro-expression datastore ("FMED").

17. The one or more non-transitory computer-readable storage media of claim 16, wherein to determine the sequence of micro-expressions from the video or series of images, the program instructions further cause the one or more processors to:
map the video or series of images to a series of FMELs using the created FMEM.

18. The one or more non-transitory computer-readable storage media of claim 17, wherein to compare the determined sequence of micro-expressions to a stored sequence of micro-expressions, the program instructions further cause the one or more processors to:

compare an encoded series of FMELs to a stored encoded series of FMELs.

* * * * *